F. M. JOSLIN.
MACHINE FOR MAKING PARTITIONS FOR BOXES.
APPLICATION FILED MAR. 29, 1920.

1,353,344. Patented Sept. 21, 1920.
10 SHEETS—SHEET 1.

F. M. JOSLIN.
MACHINE FOR MAKING PARTITIONS FOR BOXES.
APPLICATION FILED MAR. 29, 1920.

1,353,344.

Patented Sept. 21, 1920.
10 SHEETS—SHEET 8.

Inventor
Frank M. Joslin,

Witness
Edwin L. Bradford

By Foster, Freeman, Watson & Coit,
Attorneys.

F. M. JOSLIN.
MACHINE FOR MAKING PARTITIONS FOR BOXES.
APPLICATION FILED MAR. 29, 1920.
1,353,344.
Patented Sept. 21, 1920.
10 SHEETS—SHEET 9.
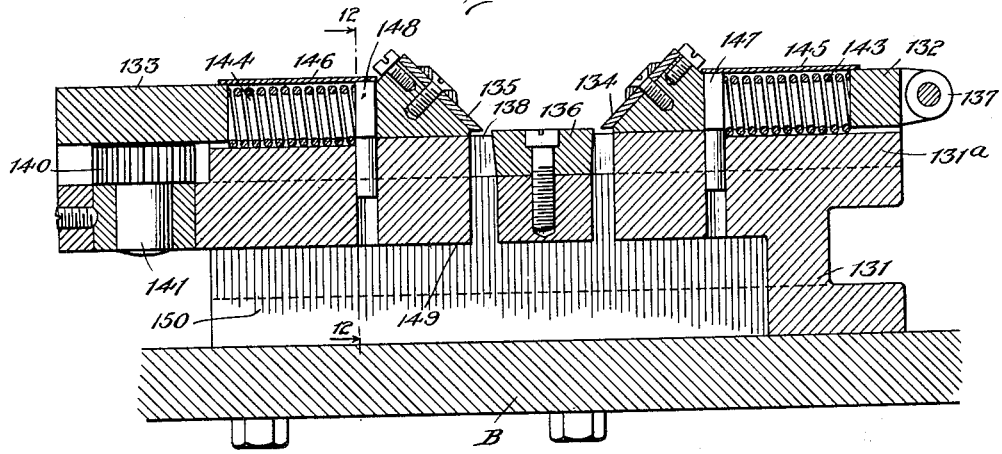
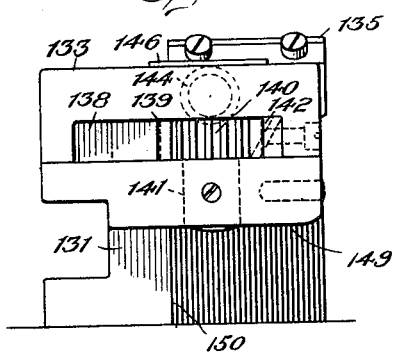
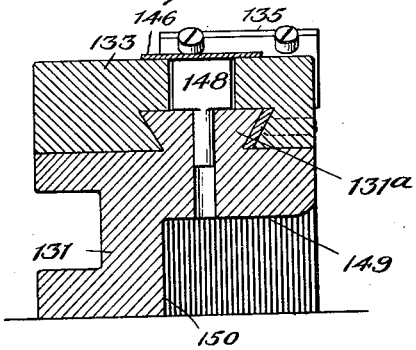
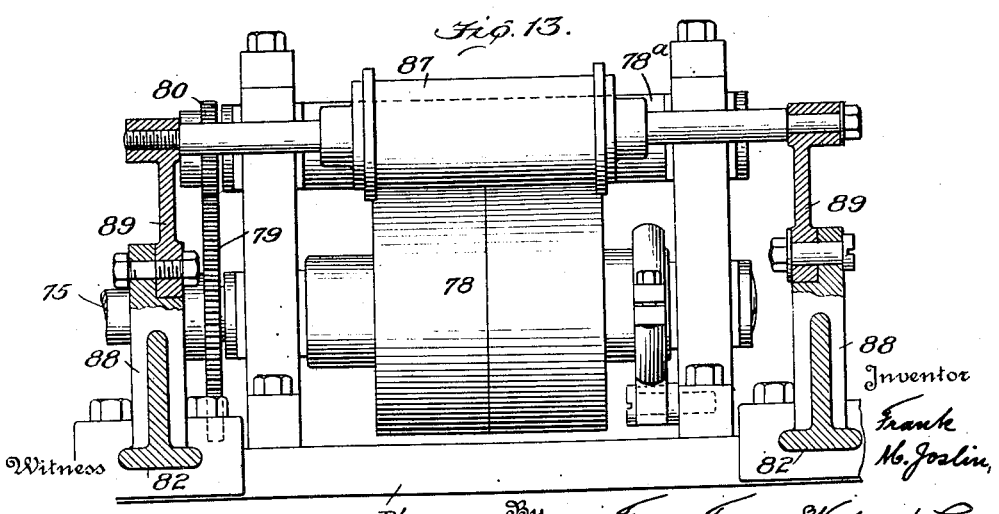

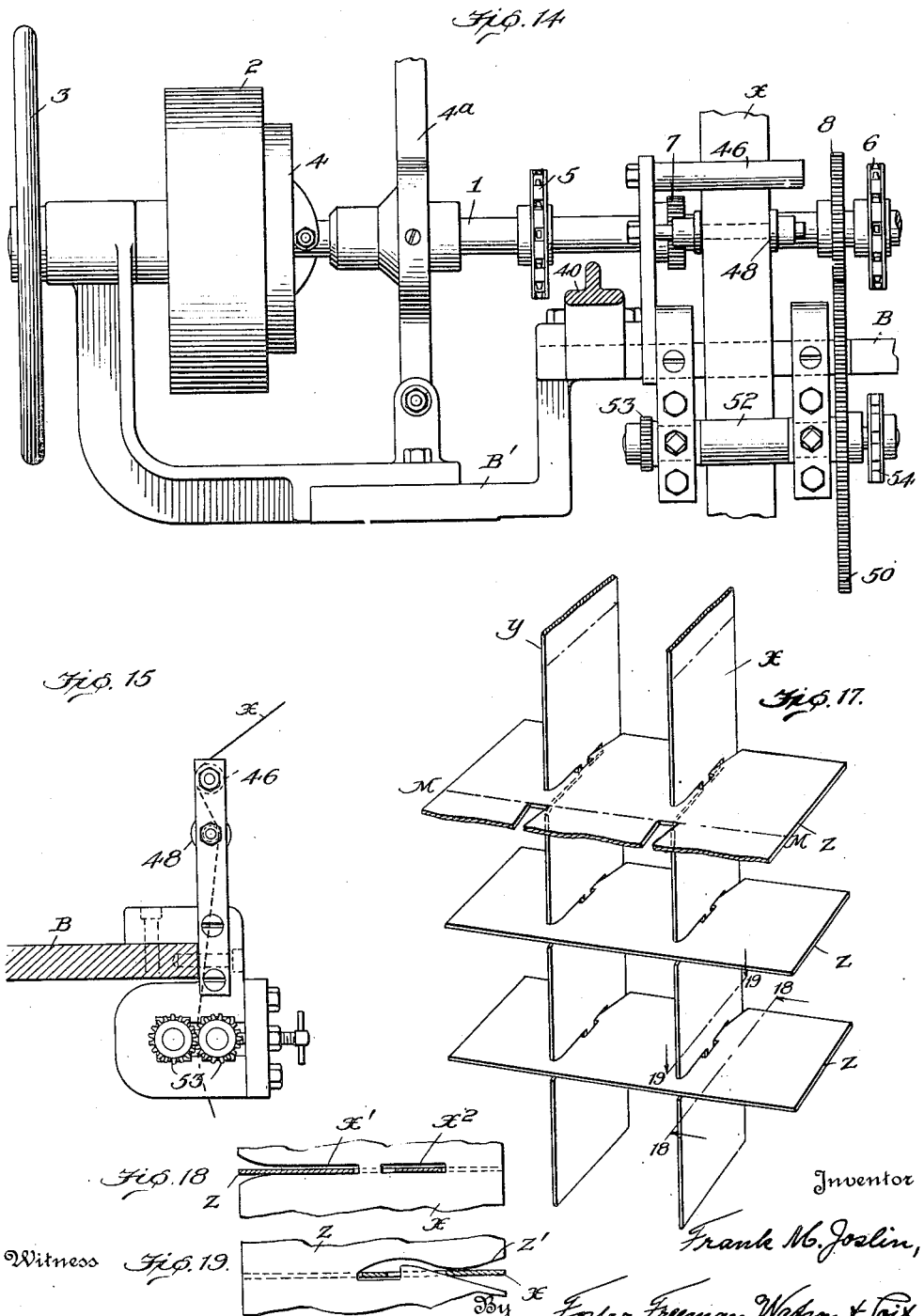

UNITED STATES PATENT OFFICE.

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK.

MACHINE FOR MAKING PARTITIONS FOR BOXES.

1,353,344.

Specification of Letters Patent.  Patented Sept. 21, 1920.

Application filed March 29, 1920. Serial No. 369,487.

*To all whom it may concern:*

Be it known that I, FRANK M. JOSLIN, a citizen of the United States, and residing at Amsterdam, Montgomery county, State of New York, have invented certain new and useful Improvements in Machines for Making Partitions for Boxes, of which the following is a specification.

My invention relates to machines for making partitions for boxes such as egg crates and the like in which a plurality of strips of suitable sheet material, such as pasteboard, are interlocked with other strips extending at right angles thereto, the two sets of strips forming a series of separate compartments in which the individual articles may be placed.

The general object of the invention is to provide a machine which will operate automatically to prepare the strips so that they are capable of being interlocked and to assemble the same in interlocked relation to produce the completed article.

Certain special objects are to provide a machine in which a plurality of strips of material adapted to form the longitudinal members of the finished article are drawn continuously from suitable supplies, brought together and carried to a feeding mechanism which serves to feed the same intermittently to a punching mechanism which operates intermittently to punch suitable slots in the assembled strips; to provide means by which the feeding mechanism and punching mechanism coöperate to form the slots of each strip in groups, which groups are spaced a greater distance than the slots in the groups; to provide means for separating and properly spacing the strips after being punched; to provide means for punching a series of slots in a sheet of material and feeding the same edgewise into interlocking engagement with the strips and crosswise thereof for the purpose of forming the transverse members of the finished article; to provide means for cutting off portions of said sheet and for cutting off said strips at predetermined intervals and intermediate the end slots of adjacent groups; and to provide certain improvements in various details of the construction by which the machine is rendered more efficient and serviceable for the purpose intended.

With these and other objects in view, my invention is embraced in the construction hereinafter described and embodied in the appended claims.

Referring to the drawings:

Fig. 10 is a longitudinal section of the mechanism employed for cutting the strips, this view being taken on the line 10—10, Fig. 7;

Fig. 11 is an end view of said cutting mechanism;

Fig. 12 is a transverse section of said cutting mechanism taken on the line 12—12 of Fig. 10;

Fig. 13 is a view partly in elevation and partly in section illustrating the details of the mechanism for feeding the sheets of material from which the transverse members of the finished article are to be produced;

Fig. 14 is a view in elevation of certain parts of the machine showing particularly the mechanism designed to draw the strips from the source of supply and feed the same to the strip feeding rolls illustrated particularly in Figs. 8 and 9;

Fig. 15 is a view in end elevation showing certain of the details of parts of the mechanism appearing in Fig. 14;

Fig. 16 is a sectional view taken on the line 16—16 of Fig. 1 showing the construction of the friction blocks through which the strips of material are drawn;

Fig. 17 is a perspective view of the article which the machine is intended to produce, this view showing the article with the sheet Z engaging the last slot of a group in the strips X and Y and just prior to the time that the sheet and strips are cut off to complete the article;

Figure 1:
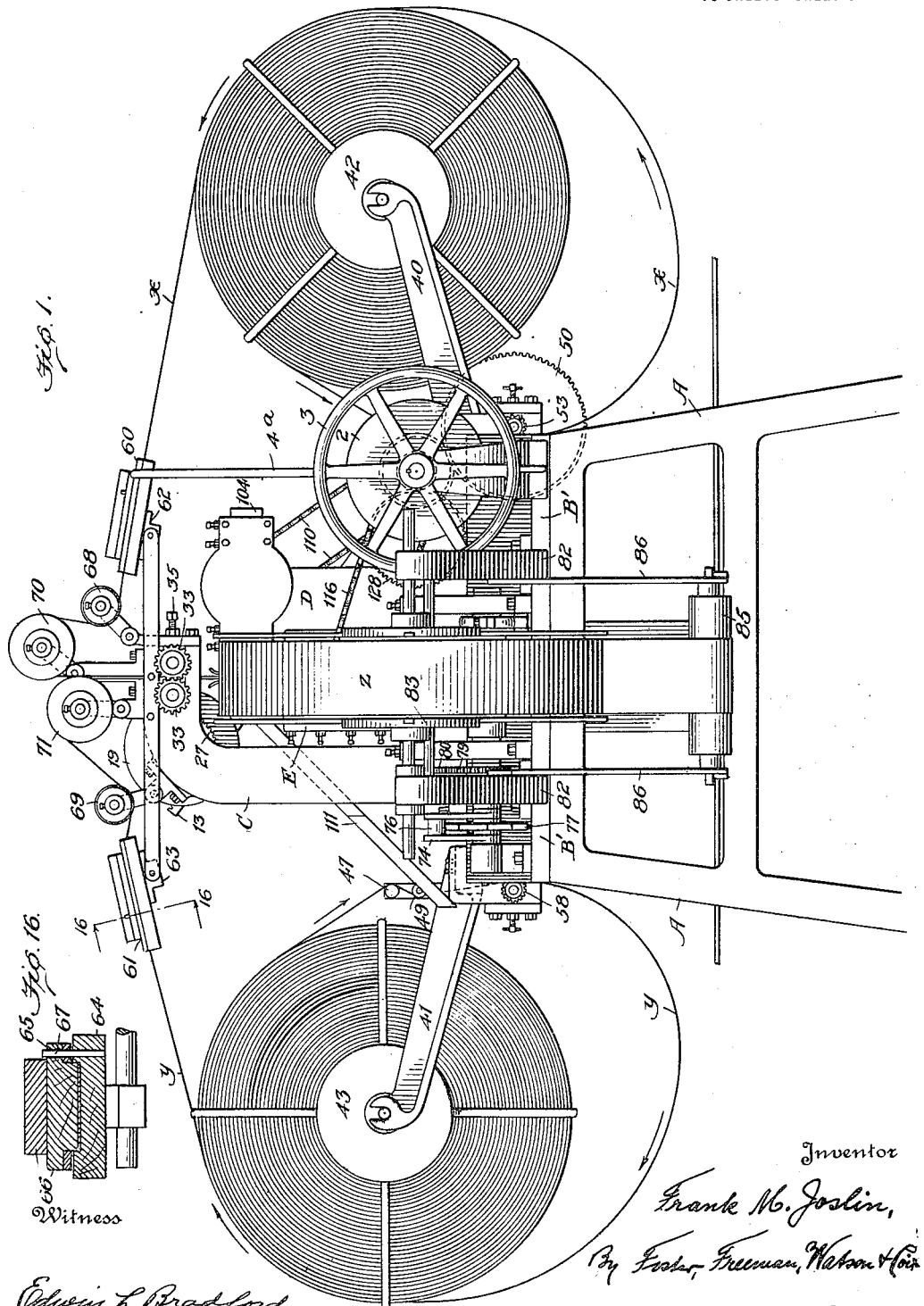
Figure 1 shows a side elevation of the machine.
Figure 2:
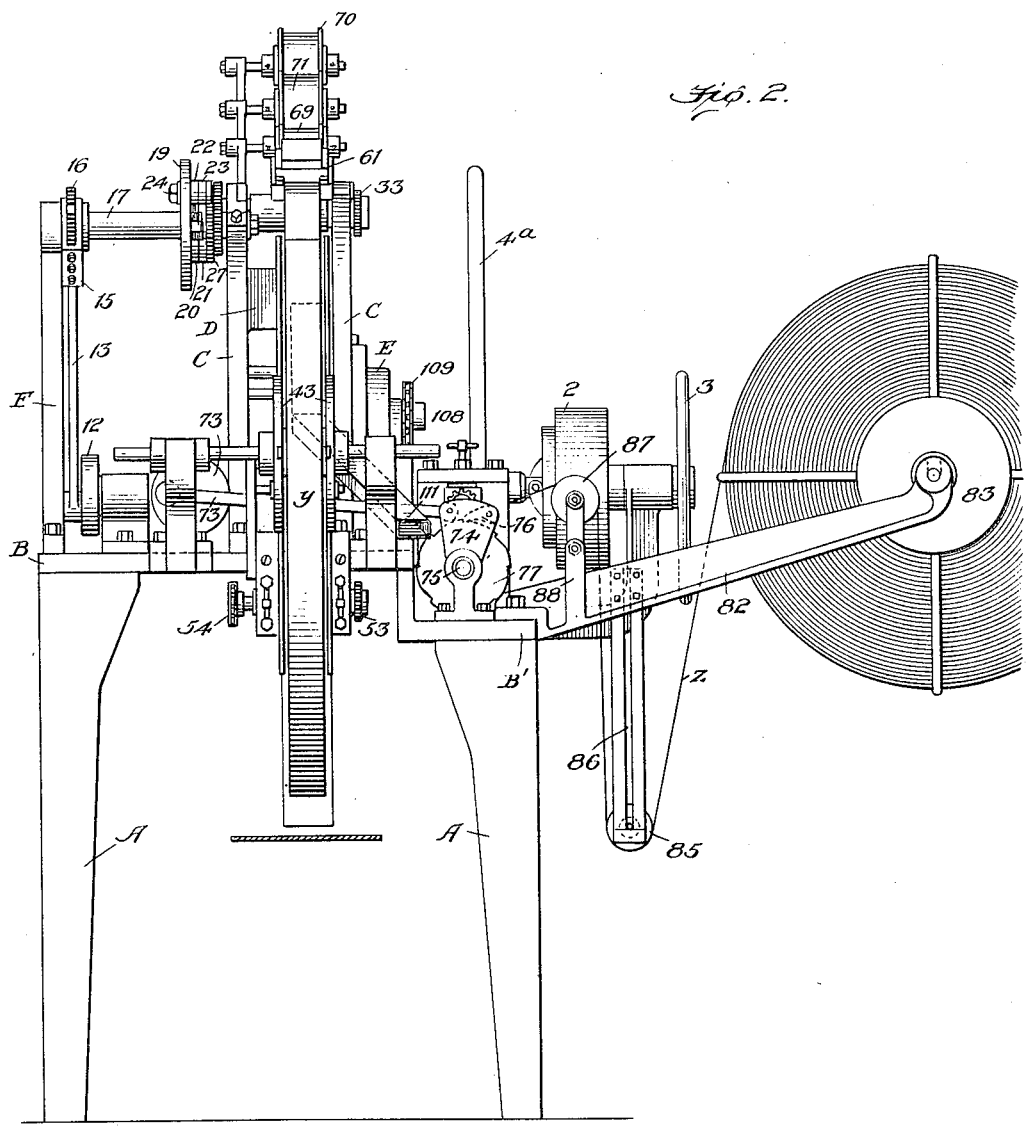
Fig. 2 is an end elevation of the same.
Figure 3:
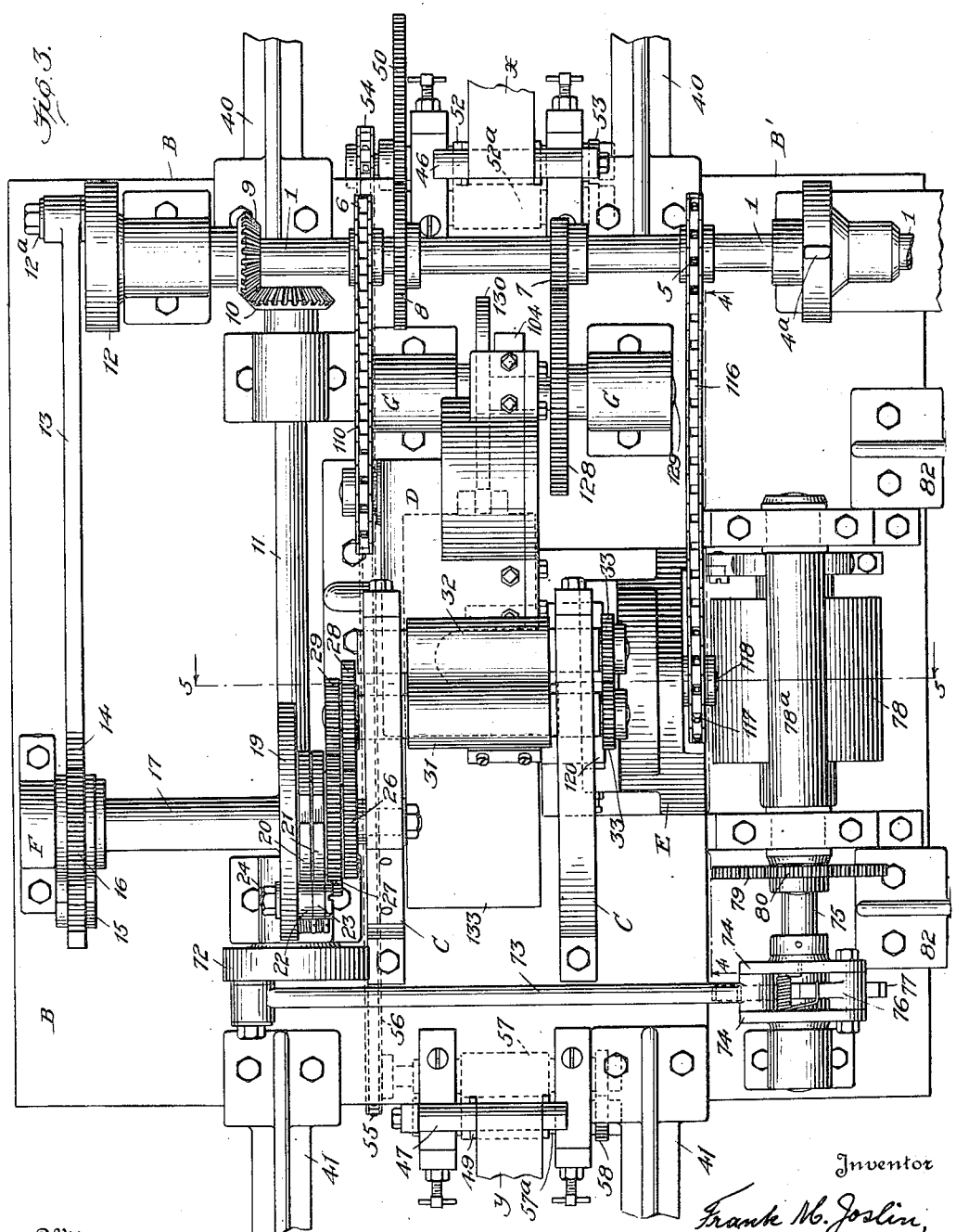
Fig. 3 is a plan view certain parts at the ends and one side of the machine being omitted.
Figure 4:
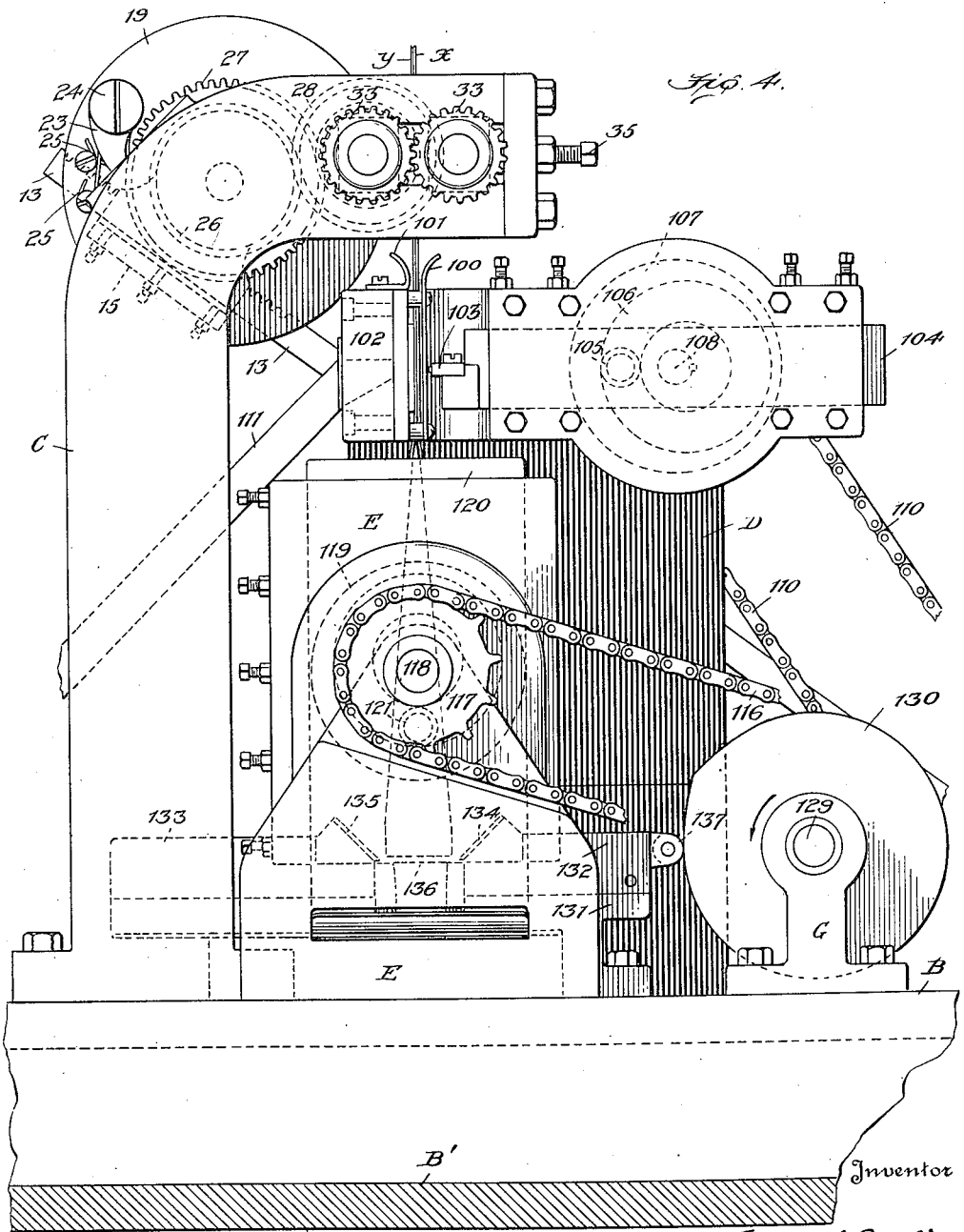
Fig. 4 is a sectional view on the line 4—4 of Fig. 3, some of the principal parts of the mechanism appearing in elevation.
Figure 5:
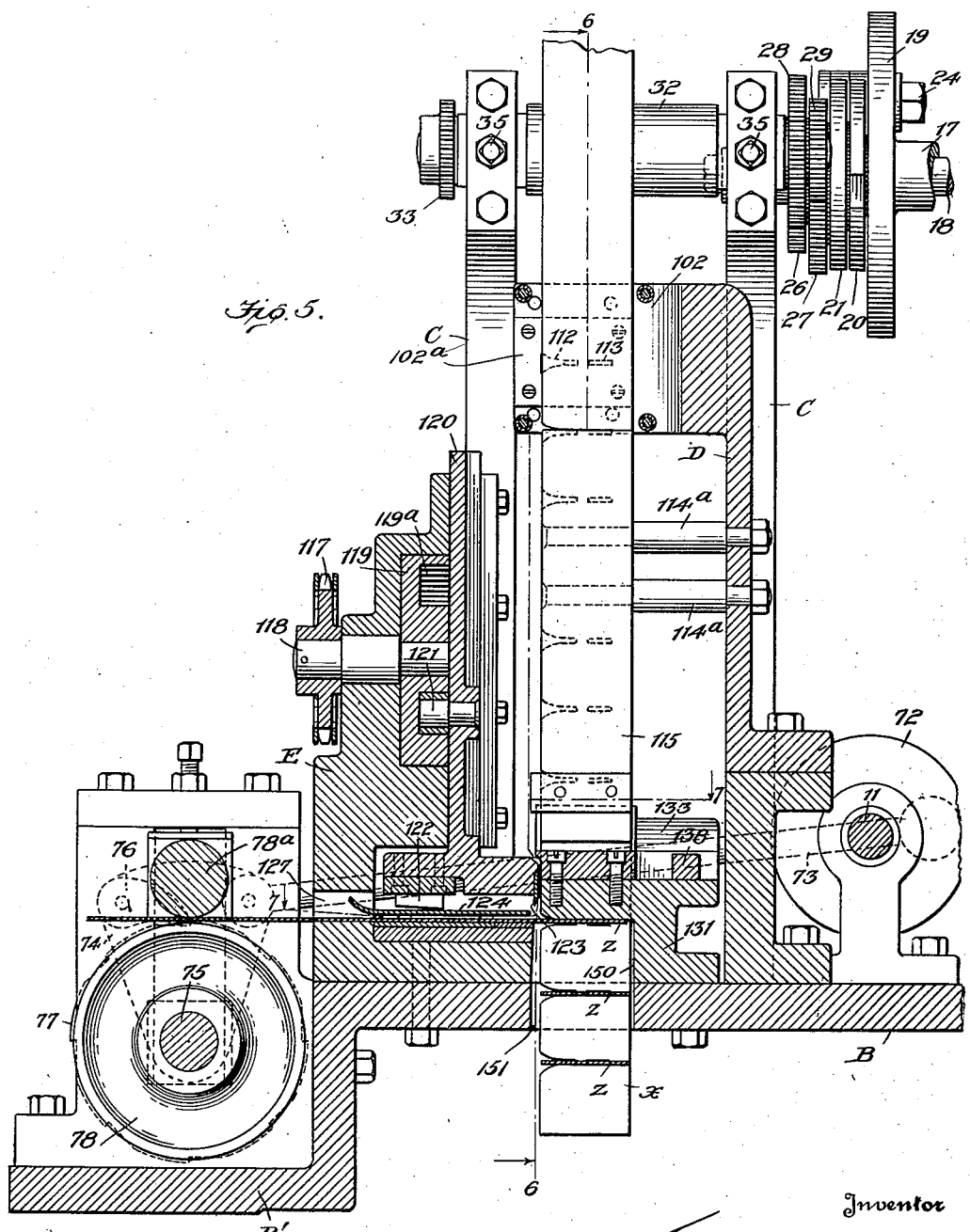
Fig. 5 is a sectional view on the line 5—5 of Fig. 3, this view being taken at right angles to that shown in Fig. 4.
Figure 6:
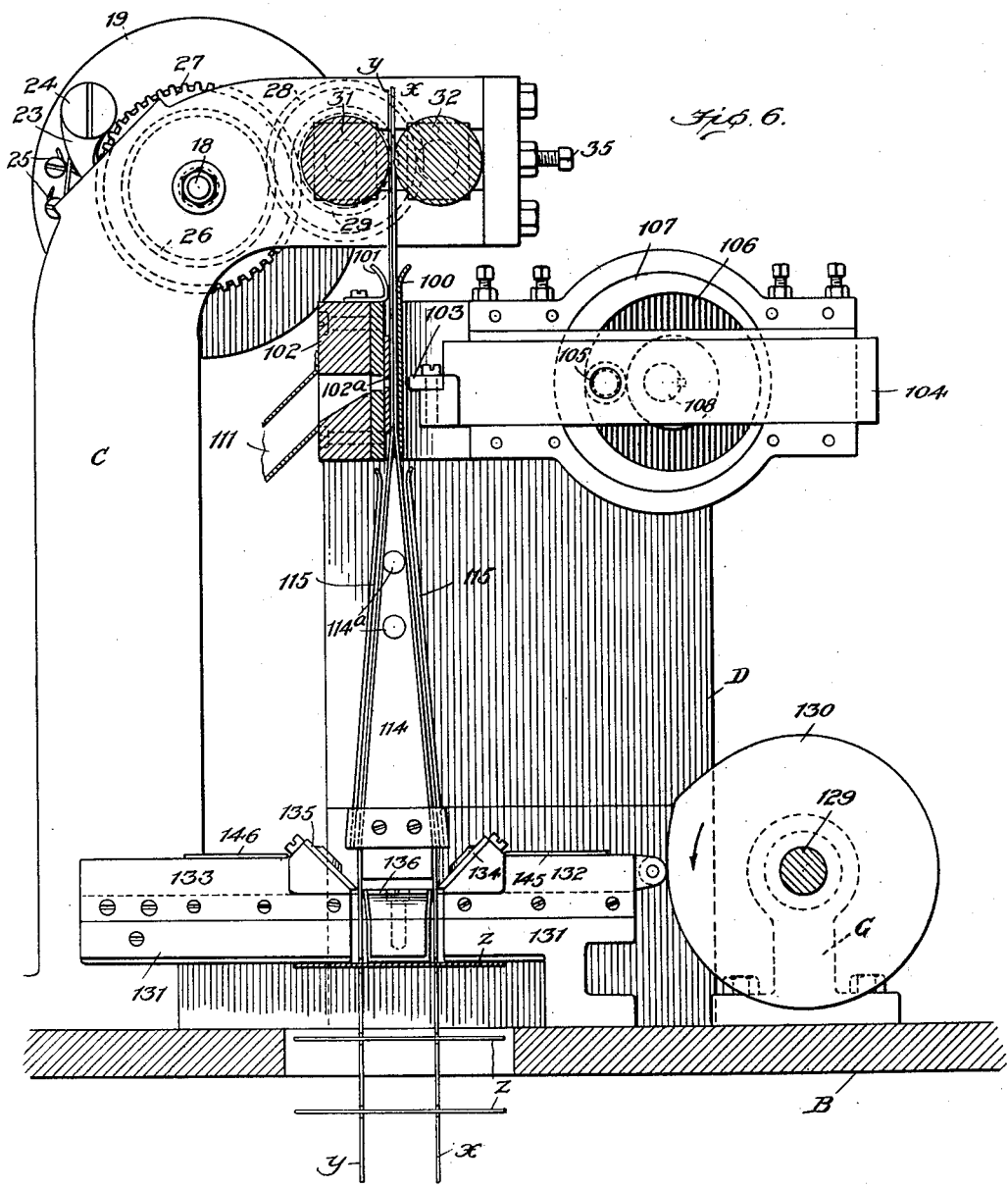
Fig. 6 is a sectional view on the broken line 6—6 of Fig. 5, parts appearing in elevation.
Figure 7:
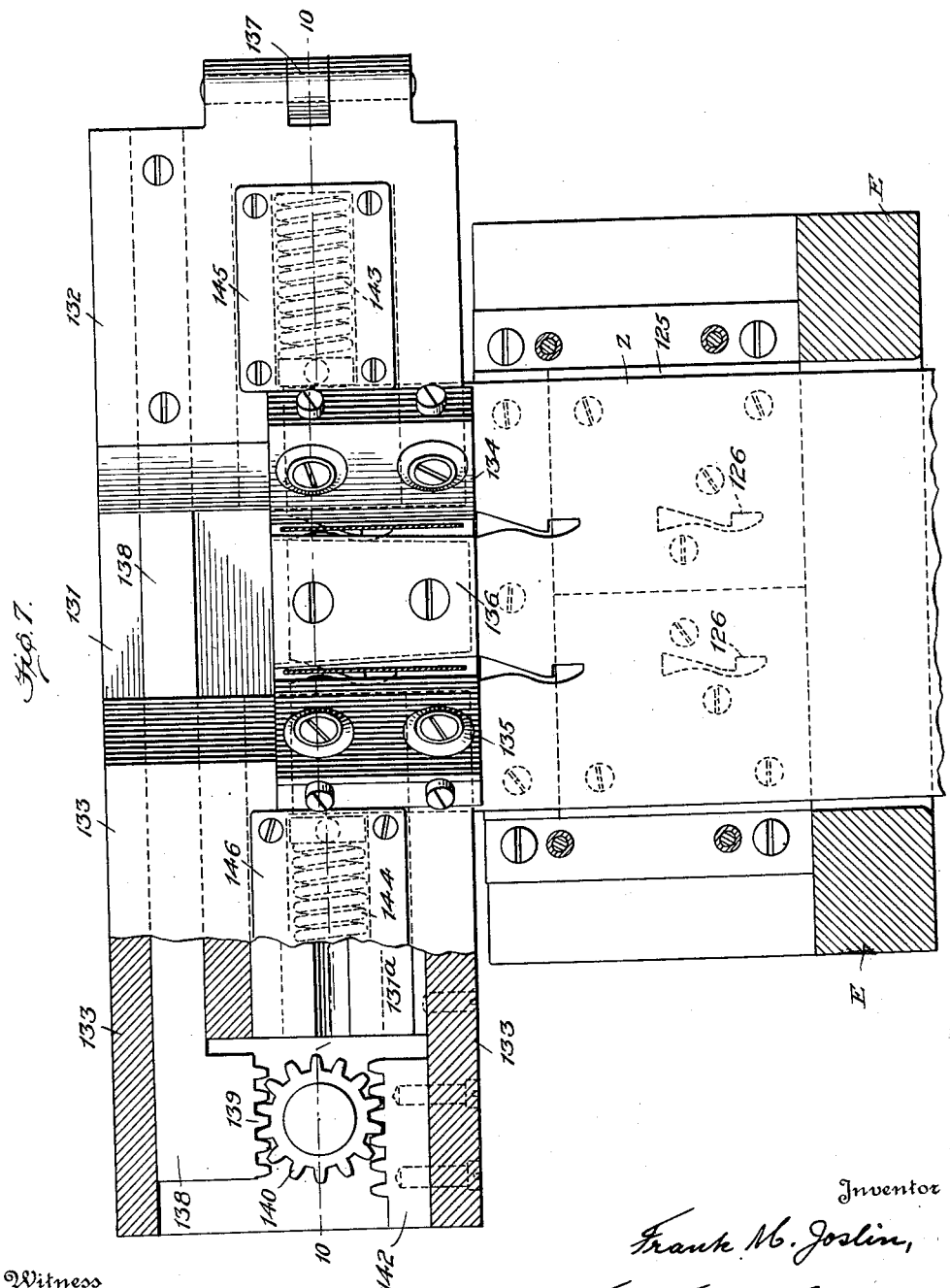
Fig. 7 is a sectional view taken on the broken line 7—7 of Fig. 5, certain parts being shown in plan and others in section.

Figs. 18 and 19 are sectional views taken on the lines 18—18 and 19—19 of Fig. 17 showing the manner in which the members of the finished article are interlocked.

Referring to the article which the machine is intended to produce it will be noted that the said article comprises two longitudinal members which are designated in Fig. 17 as X and Y, these longitudinal members being produced from strips of material which are supplied to the machine from suitable sources, these strips also being designated as X and Y in other views of the drawing. The finished article also includes the transverse members designated Z. It will be noted that the members X and Y are provided with slots $X'$, $X^2$, one an open slot and the other a closed slot, and that the member Z is provided with an open hook-shaped slot $Z'$. In assembling the members to form the completed article the open slots of one member engage the open slots of the other members and a part forming the hooked slot of one engages the closed slot of the other by which the parts are held in interlocked relation. This construction is old and well known and no novelty is alleged to reside in the same.

The machine of the present invention is intended to be supported in elevated position by suitable standards A upon which is mounted a base consisting of two parts B, $B'$, one of which is slightly elevated with reference to the other. Secured to this base are suitable standards D, C, E, F and G which are adapted to support various parts of the mechanism.

Referring now to the detailed construction of the machine, 1 designates the main driving shaft which is adapted to be driven from a source of power 2. A hand wheel 3 is also provided which may be used for rotating said shaft.

A clutch 4 operated by a hand lever $4^a$ serves to connect the shaft 1 to the source of power 2. The shaft 1 has mounted thereon two sprocket wheels 5 and 6 for a purpose hereinafter pointed out. This shaft also carries two gears 7 and 8 which are adapted to coöperate with other gears for driving certain parts of the mechanism hereinafter described. A beveled gear 9 is also mounted on the shaft 1, such gear meshing with a similar gear 10 mounted on a shaft 11, the purpose of which construction will hereinafter appear. The shaft 1 is further provided with a crank disk 12 provided with a crank pin $12^a$ from which motion is transmitted to certain parts of the machine.

*Strip feeding mechanism.*

Referring now in detail to the mechanism for feeding the strips through the machine it will be noted that a rack bar 13 engages the crank pin $12^a$ on the crank disk 12, which causes reciprocation of said bar. This bar is provided with a series of teeth 14, and is slidably engaged in a suitable guide way 15 which serves to hold the teeth of the rack bar in engagement with the teeth of the gear wheel 16, this wheel 16 being rigidly secured to a hollow shaft 17 mounted upon a rod 18 secured to the standards C, F of the machine. The end of the hollow shaft opposite the gear 16 is provided with a disk 19. Mounted upon the disk 19 are two dogs 22 and 23, said dogs being pivoted upon a suitable bolt or shaft 24 secured to said disk 19, springs 25 being provided for yieldingly engaging said dogs. It should be understood that the rack bar 13 serves to give a reciprocating motion to the gear 16, the hollow shaft 17, the disk 19, and the parts connected thereto, the purpose of which will hereinafter appear. A ratchet plate 20 is loosely mounted upon the rod 18 adjacent the said disk 19, said ratchet plate being provided with suitable notches in which the dog 22 is adapted to engage. This ratchet plate is also provided with a hub portion upon which a second ratchet plate 21 is loosely mounted, this second ratchet being in position to be engaged by the dog 23 and also having a hub portion. A gear 26 is keyed to the hub portion of the ratchet plate 20 and the gear 27 is keyed to the hub portion of the ratchet plate 21. The gear 26 is adapted to coöperate with a gear 28, and the gear 27 with a gear 29, said gears 28 and 29 being rigidly mounted upon a shaft 30 to which is secured a feed roll 31 adjacent to which is mounted a coöperating feed roll 32, said feed rolls being caused to operate in unison by means of gears 33 one of which is secured to the shaft of the feed roll 31 and the other to the shaft of the feed roll 32. Means such as set screws 35 are provided for adjusting the feed roll 32 toward and from the feed roll 31.

Figure 8:
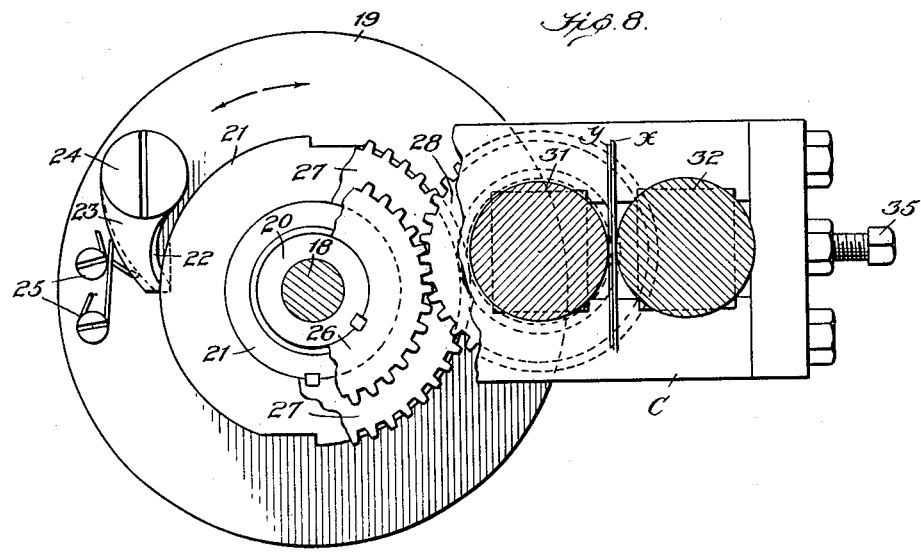
Fig. 8 is a view showing the details of the mechanism for driving the feed rolls for feeding the strips through the machine, parts being broken away.
Figure 9:
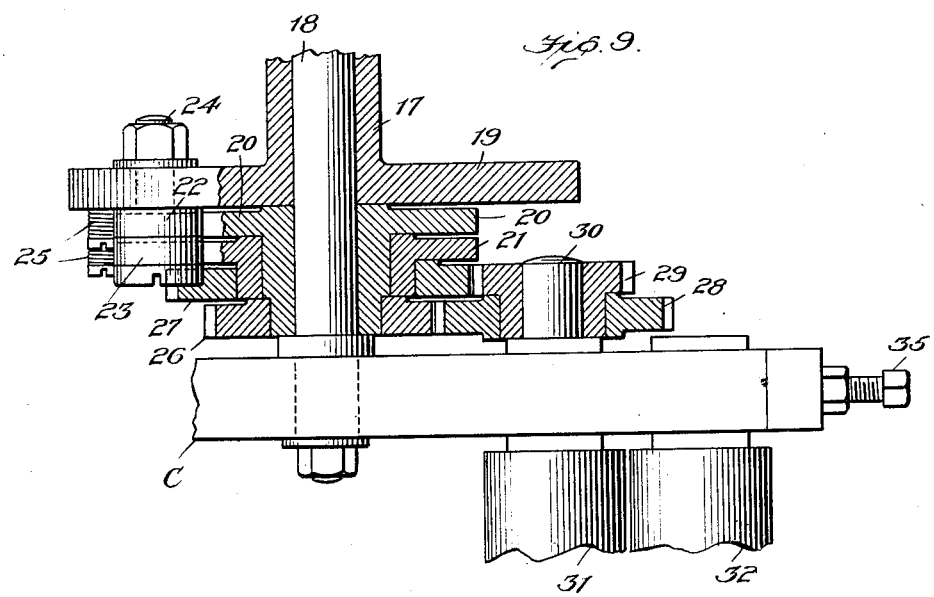
Fig. 9 is a sectional view of certain of the parts of the mechanism illustrated in Fig. 8.

Referring particularly to Figs. 8 and 9, it will be noted that the ratchet plate 20 is provided on its periphery with three notches in which the dog 22 is adapted to engage, two of these notches being arranged 180° apart and the other intermediate the first two. It will also be noted that the ratchet plate 21 is provided on its periphery with two notches 180° apart in which the dog 23 is adapted to engage. The coöperating gears 26, 28 are of the same size while in gear 27 is larger than the gear 29, the relative size of these gears being such that when the shaft 30 is driven thereby it rotates twice as fast as when driven by gears 26, 28. The movements of the disk 19 are such as to rotate the ratchet plates 20 or 21 (depending on which is engaged by the dogs), through an angle of 90° during such movement of the disk. The notches on the ratchet plates 20 and 21 are so arranged that the feed rolls are successively given two movements through the medium of the ratchet plate 20 followed by one movement through the medium of the ratchet plate 21, with the result that the strips are advanced intermittently and are fed a certain distance during each of two operations followed by a movement twice as great during a third operation. The result and purpose of this arrangement will later appear.

*Strip holding and supplying means.*

The material from which the longitudinal strips are to be made is mounted on suitable reels 42 and 43 at the sides of the machine, these reels being supported by suitable arms 40, 41 secured to the rigid part of the frame work. At each side of the machine suitable mechanism is provided for receiving and feeding the strip of material as it leaves the reels. Guide members 46, 47, also 48 and 49, mounted upon fixed supports are adapted to receive the material. Below said guide members at one side of the machine suitable feed rolls 52, 52ª, are provided, which guide rolls are driven from the gear 50 which coöperates with the gear 8 secured to the shaft 1. The feed rolls 52, 52ª are caused to operate in unison by means of intermeshing gears 53 secured to the ends of the shafts which carry said rolls. It should be noted that the shaft which carries the gear 50 is also provided with a sprocket wheel 54 which is adapted to receive a sprocket chain 56 extending beneath the base of the machine and engaging with a sprocket 55 at the opposite end of the machine, the sprocket 55 being mounted upon a shaft to which a feed roll 57 is secured. The feed roll 57 coöperates with an adjacent roll 57ª, the two being caused to rotate in unison by means of coöperating gears 58.

After the material passes the feed rolls 52, 52ª on one side of the machine, and 57, 57ª on the other side of the machine, it is carried back into contact with the material on the reels, this arrangement being resorted to in order that a certain amount of slack in the material may be provided for. The strip X is next caused to pass through the friction block 60 on one side of the machine and the strip Y, through a similar friction block on the other side of the machine, these friction blocks being pivotally mounted at 62 and 63 upon a fixed part of the machine. Each of said friction blocks comprises a bottom member 64 and a top member 65 upon which a weight 66 is placed, the two members 64 and 65 being held together in any suitable manner as by means of pins 67. After passing through the friction block 60 the strip X is led into engagement with a suitable guiding and tensioning roll 68, the strip Y engaging a similar roll 69. Above said rolls 68 and 69 other guiding and tensioning rolls 70 and 71 are provided, said last mentioned rolls serving to bring the strips X and Y together in line with the feed rolls 31 and 32, heretofore referred to.

*Sheet feeding mechanism.*

The shaft 11 has secured thereto a crank disk 72 to which is secured a rod 73, said rod being given a reciprocating movement by the rotation of said crank disk 72. The reciprocating rod 73 is pivoted between plates 74 loosely mounted on a shaft 75. A ratchet 76 is mounted between said plate 74 and is adapted to coöperate with a ratchet wheel 77 rigidly secured to said shaft 75. The shaft 75 carries the feed roll 78 mounted above which is a coöperating feed roll 78ª, the feed rolls 78 and 78ª being driven in unison by the coöperating gears 79 and 80, the former being secured to the shaft 75.

The material which is to be supplied in sheet form is mounted upon a reel supported by suitable arms 82 secured to a rigid portion of the frame work. The sheet of material which is designated as Z is first caused to contact with a tensioning roll 85 loosely mounted in a slotted arm 86 also rigidly secured to the frame work of the machine. After passing the tensioning roll 85 the strip Z is led into contact with a suitable guide and tensioning roll 87 mounted in adjustable standards 89 connected to fixed standards 88 rigidly secured to the parts 82 and after passing such roll it is led between the feed rolls 78 and 78ª heretofore described, which intermittently feed the same.

*Strip punching and guiding mechanism.*

After passing the feed rolls 31, 32 heretofore described, the strips are led to the punching mechanism which consists of a stationary member 102 secured to the standard D of the machine and provided with a die plate 102ª, and a movable member 103 mounted upon a reciprocating carrier 104. A combined guide and stripper plate 101 is arranged to guide the strips past the punching mechanism and this guide plate coöperates with a second guide plate 100 secured to the part 102. The members 102ª and 103 are shaped to slot the strips in the manner heretofore described and as shown at 112 and 113. The carrier 104 is reciprocated through the medium of a pin 105 which engages a cam slot 106 in the cam plate 107, this plate being rigidly secured to a shaft 108, said shaft also being mounted in the standard D of the machine. A sprocket wheel 109 is keyed to the shaft 108 and a sprocket chain 110 engages this wheel and also the sprocket wheel 6 heretofore referred to mounted upon the main driving shaft 1. Waste material which is cut from the strips by the punching members 102ª and 103 is directed through a chute 111 to any desired point. Below the punching mechanism just described there is mounted a wedge shaped member 114 secured to the standard D by means of rigid supports 114ª. On each side of the member 114 suitable guides 115 are provided, it being understood that said member 114 serves as a means for separating the strips after they have been punched, the strips passing between the sides of said member and the guides 115 to the cutting mechanism which will be later described.

*Sheet punching and cutting mechanism.*

The sprocket wheel 5 heretofore referred to mounted on the main shaft of the machine is engaged by a sprocket chain 116 which sprocket chain also engages a sprocket wheel 117 secured to the shaft 118 which is mounted in the standard E of the machine. A cam plate 119 having a cam groove 119ª is secured to the shaft 118 and a reciprocating member 120 mounted in suitable guide-ways in the standard E is provided with the pin 121 which engages in the groove in said cam plate 119, this construction serving to give a reciprocating motion to said member 120. The lower end of said member is provided with an enlarged portion or head to which are secured punches 122 which are so shaped as to produce hook-shaped slots in the material forming the cross members of the finished article. A cutter 123 is also secured to said head or enlarged portion of the member 120 which cutter operates to cut from the sheet a portion of material after the end of the sheet has been forced into interlocking engagement with the strips heretofore referred to. It is to be understood that the punching members 122 heretofore referred to coöperate with a fixed die plate 125 over which the material is adapted to pass, this die plate having openings 126 into which the punching members 122 are adapted to pass. A suitable stripper plate 124 is mounted a short distance above said fixed die plate so as to form a guide-way through which the sheet material is adapted to pass. The standard E is provided with an opening 127 through which the sheet material passes in traveling from the feed rolls 78, 78ª to the cutting and punching mechanism just described. It is to be understood that the action of said feed rolls and said cutting and punching mechanism is so timed that after the sheet of material is fed into engagement with the strips the engaging portion thereof is separated from the rest of the sheet by the action of the cutter 123 which cuts the sheet along a line M—M (Fig. 17), which intersects the ends of the slots which have been previously produced by the action of punches 122, the result being that at the time the sheet is fed by said rolls 78, 78ª its forward end is provided with slots which engage with the slots formed in the strips positioned in the line of movement of the sheet.

*Strip cutting mechanism.*

After a certain predetermined number of portions have been cut from the sheet and interlocked with the strips, the strips are cut off and the mechanism for accomplishing that result will now be described. The gear 128 is secured to the shaft 129 mounted in standards G on the base B of the machine, this gear coöperating with the gear 7 secured to the main shaft 1 of the machine. A cam 130 is mounted on the shaft 129 and is caused to operate the strip cutting mechanism at predetermined intervals. The cutting mechanism is secured to a base member 131 which is rigidly mounted upon the base B of the machine, the upper surface of said base member being provided with a dovetailed rib 131ª. Two members 132 and 133 are shaped to slidably engage said rib, said members 132 and 133 carrying cutters 134 and 135, which cutters move toward each other and coöperate with a fixed member 136 mounted therebetween. The said fixed member 136 lies immediately below the end of the wedge-shaped member heretofore referred to with the result that the strips of material which have been separated and guided by said member 114 are directed on the opposite sides of said member 136 so that when the cutters 134 and 135 are advanced toward the stationary member 136 these strips of material are severed. The sliding member 132 carries a friction wheel 137 which engages the cam 130, the rotation of the cam thus causing movement of the member 132. Attached to the member 132 is a bar 138 which projects beneath the member 133 and which is provided at its end with a series of ratchet teeth 139 adapted to engage a gear 140 secured to a short shaft 141 mounted in the base member 131. A short rack bar 142 is secured to the member 133 and is mounted so as to engage the gear wheel 140. The result of this construction is that when the member 132 is moved by the rotation of the cam 130 the member 133 is also caused to move through the action of the rock bars 138 and 142 and the gear 140 mounted between the same. The cutters 134 and 135 are thus caused to simultaneously move toward the member 136 and sever the strips of material. Means are provided for returning the cutters after they have advanced to sever the strips, this means consisting of springs 143 and 144 mounted in recesses in the members 132 and 133, the recesses being covered by suitable plates 145 and 146. These springs at one end engage the walls of the recess in which they are mounted and at the other end suitable abutments 147 and 148 are provided, these abutments consisting of members having pins adapted to engage openings in the base member 131. It is to be noted that the base member 131 has an overhanging portion 149 back of which is the wall 150, and that the strips of material project through this overhanging portion and adjacent the wall 150 when they are being engaged by the end of the sheet as heretofore described. After the strips have been severed the finished article drops through an opening 151 in the base of the machine.

Operation.

Briefly reviewing the operation of the machine it will be noted that the feed rolls 52, 52ª and 57, 57ª, serve to draw the material from the reels mounted at opposite sides of the machine. After passing these rolls the strips are led into contact with the material on the reels and then through the tensioning devices 60, 61 and over the guide and tensioning rolls at the top of the machine to the main feed rolls 31 and 32 which operate intermittently to feed the strips to the punching mechanism, these rolls at predetermined intervals being caused to rotate at a greater speed by means of the construction of the ratchet wheels 20 and 21 and the gear mechanism connected therewith. The punching mechanism acts intermittently at regular intervals to punch suitable slots in the strips and since the strips are fed more rapidly at certain intervals it follows that the strips are punched with groups of slots spaced apart at equal distances in the groups and that the end slots of adjacent groups are spaced a greater distance apart than the slots in the groups. After passing the punching mechanism these strips are separated and suitably spaced by means of the member 114, and are caused to pass adjacent the knives 134 and 135 which operate at certain intervals to sever the strips, the parts being so formed that this severing operation is performed intermediate the end slots of adjacent groups. It is to be understood that the parts of the mechanism are so arranged as to cause the strips to be fed at a more rapid rate immediately following the time when the strips are separated. The purpose of this action will be apparent since the strips are severed above the point at which the engaging portion of the sheet is interlocked therewith and in order to bring a subsequent slot into position to receive an engaging portion of the sheet the strips must be moved a further distance. The material on which the cross members of the finished article are produced is mounted on the reel at the side of the machine as heretofore described from which it is drawn past the tensioning and guide rolls 85, 87, and through the feed rolls 78, 78ª by which it is fed past the cutting and punching mechanism which serve to cut from the sheet that portion which has been forced into interlocking engagement with the strips and to simultaneously punch a series of slots which upon a subsequent movement of the feeding mechanism are forced into interlocking engagement with said strips.

It is apparent that various modifications in the details of the mechanism may be resorted to without departing from the spirit of the invention and it is not to be understood that the invention is limited to the specific construction and arrangement described.

What I claim as my invention and desire to secure by Letters Patent is:

1. In a machine of the class described, means for feeding strips of material, means for punching slots in said strips, one of said means including mechanism whereby certain of said slots are punched at a greater distance apart than the others, means for preparing and feeding portions of material edgewise into interlocking engagement with the slots of said strips and crosswise thereof, and means for cutting off said strips intermediate the slots having the greater spaces therebetween.

2. In a machine of the class described, the combination of means for feeding strips of material and means for punching slots in said strips, means associated with one of said first mentioned means for causing certain of said slots to be punched at a distance apart substantially twice the distance between other slots, means for feeding a sheet of material edgewise into interlocking engagement with the slots of said strips and crosswise thereof, means for cutting off the engaging portion of the sheet while the sheet and strips are interlocked, and means for cutting off said strip intermediate the slots having the greater spaces therebetween.

3. In a machine of the class described, the combination of means for intermittently feeding strips of material, means operating at regular intervals to punch a series of slots in said strips, means for causing said feeding means to operate more rapidly and feed a greater length of material during certain of the feeding operations, whereby certain of said slots are spaced a greater distance than others, means for intermittently feeding a sheet of material into interlocking engagement with the slots of said strips and crosswise thereof, means for cutting off the engaging portion of the sheet while the sheet and strips are interlocked and stationary, and means for cutting off said strips intermediate the slots having the greater spaces therebetween.

4. In a machine of the class described, the combination of means for intermittently feeding strips of material, means operating at regular intervals to punch a series of slots in said strips, means causing said feeding means to operate more rapidly and feed a greater length of material during certain of the feeding operations whereby certain of said slots are spaced a greater distance than others, means for intermittently feeding a sheet of material edgewise into said slots and into interlocking engagement with said strips and crosswise thereof, means for cutting off the engaging portion of said sheet while the sheet and strips are interlocked and stationary, and means arranged between said punching means and the point where said strips and sheet are interlocked for cutting off said strips intermediate the slots having the greater spaces therebetween.

5. In a machine of the class described, means for intermittently feeding strips of material, means acting intermittently at uniform intervals to punch slots in said strips, means for causing said feeding means to feed the material more rapidly at predetermined intervals whereby a group of slots are produced in said strip having the spaces therebetween greater than the spaces between the slots of the groups, intermittently operating means for preparing and feeding portions of material edgewise into interlocking engagement with the slots of one group in said strips and crosswise of the strips during the intervals that the strips are stationary and the slots of a succeeding group are being punched, and means between said punching means and the point where the strips and sheet are interlocked for cutting off said strips after the last slot of a group has received a transverse interlocking portion and before said feeding means again become operative.

6. In a machine of the class described, the combination of means for intermittently feeding a plurality of strips in assembled relation, a single punching means for simultaneously slotting the assembled strips, means for separating and spacing the strips after they are slotted, means for intermittently feeding a sheet of slotted material edgewise of said strips and crosswise thereof, whereby the slots of the strips and sheet are caused to interlock, means for cutting off a portion of said sheet after the same is interlocked with said strip, and means for cutting off the strips at predetermined intervals.

7. In a machine of the class described, the combination of means for guiding a series of strips into assembled relation, feed rolls adapted to intermittently feed said assembled strip, a single punching means operating intermittently to simultaneously slot the assembled strips, means for separating said strips after they are punched and for spacing the same the desired distance, means for slotting a sheet of material at intervals corresponding to the spacing of said strips, means for intermittently feeding the sheet edgewise of said strip and crosswise thereof, whereby the slots on the same are caused to interlock with the slots of the strips, means for cutting off a portion of said sheet after the same is interlocked with said strips, and means for cutting off the strips at predetermined intervals.

8. In a machine of the class described, the combination of means for guiding a plurality of strips of material into assembled relation, intermittently operating feeding means for feeding the assembled strips, means for causing said feeding means to feed the assembled strips more rapidly at predetermined intervals, a single intermittent operating punching means adapted to simultaneously punch slots in the assembled strips, means for separating and suitably spacing the strips after they are perforated, means for slotting a sheet of material at intervals corresponding to the spacing of said strips, means for intermittently feeding the sheet edgewise of said strip and crosswise thereof, whereby the slots in the same are caused to interlock with the slots of the strips, means for cutting off a portion of said sheet after the same is interlocked with the strips, and means for cutting off the strips at predetermined intervals.

9. In a machine of the class described, the combination of a plurality of continuously operating feeding means adapted to feed a plurality of strips of material, a single intermittently operating feeding means adapted to receive the strips fed by said plurality of feeding means and feed the same through the machine, a single intermittently operating punching mechanism which acts to simultaneously slot the strips of material fed thereto, means for separating and suitably spacing the strips after they are punched, means for slotting a sheet of material at intervals corresponding to the spacing of said strips, means for intermittently feeding the sheet edgewise of said strips and crosswise thereof, whereby the slots in the same are caused to interlock with the slots of the strips, means for cutting off a portion of said sheet after the same is interlocked with the strips, and means for cutting off the strips at predetermined intervals.

10. In a machine of the class described, the combination of means for intermittently feeding a plurality of strips in assembled relation, a single punching means for simultaneously slotting the assembled strips, means for separating and spacing the strips after they are slotted, means for intermittently feeding portions of slotted material edgewise of said spaced strips and into interlocking engagement with the slots thereof, and means for cutting off the strips at predetermined intervals.

In testimony whereof I affix my signature.

FRANK M. JOSLIN.